(12) United States Patent
Lee et al.

(10) Patent No.: US 11,509,014 B2
(45) Date of Patent: Nov. 22, 2022

(54) BATTERY RACK AND POWER STORAGE APPARATUS INCLUDING THE SAME

(71) Applicant: LG CHEM, LTD., Seoul (KR)

(72) Inventors: Seung-Yoon Lee, Daejeon (KR); Yong-Il Kim, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 119 days.

(21) Appl. No.: 16/980,525

(22) PCT Filed: Dec. 23, 2019

(86) PCT No.: PCT/KR2019/018306
§ 371 (c)(1),
(2) Date: Sep. 14, 2020

(87) PCT Pub. No.: WO2020/149545
PCT Pub. Date: Jul. 23, 2020

(65) Prior Publication Data
US 2021/0013466 A1    Jan. 14, 2021

(30) Foreign Application Priority Data

Jan. 17, 2019  (KR) .......................... 10-2019-0006391

(51) Int. Cl.
*H01M 50/20* (2021.01)
*H01M 50/148* (2021.01)
*H01M 10/04* (2006.01)
*H01M 10/42* (2006.01)

(52) U.S. Cl.
CPC ....... *H01M 50/20* (2021.01); *H01M 10/0472* (2013.01); *H01M 10/4207* (2013.01); *H01M 50/148* (2021.01)

(58) Field of Classification Search
None
See application file for complete search history.

(56) References Cited

U.S. PATENT DOCUMENTS

2002/0086202 A1   7/2002  Stone et al.
2012/0263989 A1  10/2012  Byun et al.

FOREIGN PATENT DOCUMENTS

CN   205231544 U    5/2016
CN   208142243 U   11/2018
JP   2012-22991 A   2/2012
(Continued)

OTHER PUBLICATIONS

Sun, KR20170049382A—Machine Translation (Year: 2017).*
(Continued)

*Primary Examiner* — Brian R Ohara
*Assistant Examiner* — Patrick Marshall Greene
(74) *Attorney, Agent, or Firm* — Birch Stewart, Kolasch & Birch, LLP

(57) ABSTRACT

A battery pack includes a base plate forming a bottom surface; a main frame combined to the base plate and extending in a height direction to form a wall structure for supporting both side portions of the plurality of battery modules; and a top plate combined to an upper portion of the main frame to form a ceiling, wherein at least one of the top plate and the base plate is provided in a plate body shape including a bead.

14 Claims, 6 Drawing Sheets

(56) References Cited

FOREIGN PATENT DOCUMENTS

| | | |
|---|---|---|
| JP | 2016-514344 A | 5/2016 |
| KR | 20-2000-0011629 U | 7/2000 |
| KR | 10-2003-0038773 A | 5/2003 |
| KR | 10-2012-0117413 A | 10/2012 |
| KR | 10-1278506 B1 | 7/2013 |
| KR | 10-2013-0110246 A | 10/2013 |
| KR | 10-2015-0015179 A | 2/2015 |
| KR | 10-2015-0113688 A | 10/2015 |
| KR | 10-1661563 B1 | 10/2016 |
| KR | 10-2017-0047539 A | 5/2017 |
| WO | WO 2004-039212 A1 | 5/2004 |

OTHER PUBLICATIONS

Han, KR20130110246A—Machine Translation (Year: 2013).*
International Search Report (PCT/ISA/210) issued in PCT/KR2019/018306, dated Apr. 23, 2020.
European Search Report issued in application No. 19910000.9, dated Aug. 4, 2021.

* cited by examiner

BATTERY RACK AND POWER STORAGE APPARATUS INCLUDING THE SAME

TECHNICAL FIELD

The present disclosure relates to a battery rack and a power storage apparatus including the same, and more particularly, to a battery rack having enhanced seismic performance and a power storage apparatus including the battery rack.

The present application claims priority to Korean Patent Application No. 10-2019-0006391 filed on Jan. 17, 2019 in the Republic of Korea, the disclosures of which are incorporated herein by reference.

BACKGROUND ART

Secondary batteries are attracting attention as new energy sources for enhancing environmental-friendliness and energy efficiency, not only due to a primary advantage of significantly reducing the use of fossil fuel, but also in that no by-products are generated by the use of energy.

Such secondary batteries are generally applied not only to portable devices, but also to electric vehicles (EVs), power storage apparatuses (energy storage systems (ESSs)), and the like.

In particular, the power storage apparatus the power storage apparatus is a system that usually stores power and supplies the power when required, such as during power failure or power shortage, and has a structure in which a plurality of secondary batteries are stacked such that suitable operation voltage and charging capacity are secured.

In general, the power storage apparatus is provided in a form in which a plurality of batteries are stacked in predetermined rows on a power type battery rack placed on a floor provided in a power room or the like. Examples of conventional battery racks are disclosed in KR 10-1278506 B1 and KR 10-2015-0113688 A.

Meanwhile, with the recent widespread of the power storage apparatus, it is required for the power storage apparatus to essentially have ignition prevention performance and seismic performance of a certain level or above.

In this regard, as a result of active studies and development in the related art regarding ignition prevention performance of a conventional power storage apparatus, various ignition prevention methods and solutions have been disclosed, but solutions and methods regarding securing of seismic performance are relatively insufficient.

For example, regarding an existing method of enhancing seismic performance of a power storage apparatus, in many cases, a frame forming a battery rack is manufactured with a metal alloy material having high strength or is increased in thickness. However, in this case, the weight of the battery rack is increased and production costs are not economical. As an alternative, a strength reinforcing material may be added to the battery rack, but the strength reinforcing material serves as a negative factor in terms of space efficiency and is still uneconomical in terms of costs.

Accordingly, a new method for enhancing seismic performance of a power storage apparatus while reducing or maintaining the use and weights of individual materials is requested.

DISCLOSURE

Technical Problem

The present disclosure is designed to solve the problems of the related art, and therefore the present disclosure is directed to providing a battery rack capable of enhancing seismic performance while reducing or maintaining a weight compared to an existing battery rack, and a power storage apparatus including the battery rack.

Technical Solution

In one aspect of the present disclosure, there is provided a battery rack including: a base plate forming a bottom surface; a main frame combined to the base plate and extending in a height direction to form a wall structure for supporting both side portions of the plurality of battery modules; and a top plate combined to an uppermost portion of the main frame to form a ceiling, wherein at least one of the top plate and the base plate is provided in a plate body shape including a bead.

The top plate and the base plate may be rectangular plate bodies and the bead may be formed in an X shape crossing the rectangular plate bodies.

The main frame may include a pair of a first main frame and a second main frame, which are spaced apart from each other by a width of the plurality of battery modules, and each of the first main frame and the second main frame may include: a pair of vertical beams spaced apart from each other in a length direction on the base plate and each extending in a height direction; and a plurality of guide beams combined to the pair of vertical beams at regular intervals along the height direction and provided to support a bottom corner region of the plurality of battery modules.

The base plate and the top plate may each have a quadrangular plate shape and include a side protruding portion further protruding at a corner region in a width direction than another portion, and the pair of vertical beams may each have a cross-section in a "ᄅ" shape such that both end portions thereof are combined to the base plate and the top plate while surrounding the side protruding portion.

A wall mount member may be further combined to one of the pair of vertical beams in the first and second main frames.

The wall mount member may be integrally combined to one of the pair of vertical beams and the side protruding portion in a "⊏" shape.

The wall mount member may include an elastic body to elastically support the main frame with respect to a wall surface.

The wall mount member may include: a spring corresponding to the elastic body; a rack fixing portion combined to one end portion of the spring and having a screw thread formed therein; and a wall surface fixing portion combined to another end portion of the spring and including a fastening unit screw-combinable to the wall surface, wherein one of the pair of vertical beams may further include a wall mount fastening portion screw-combined to the rack fixing portion at one side.

The rack fixing portion and the wall surface fixing portion of the wall mount member may be provided to be relatively rotatable with respect to the spring.

In one aspect of the present disclosure, there is provided a power storage apparatus including: the battery rack described above; and a plurality of battery modules stacked in the battery rack in multiple stages.

Advantageous Effects

According to an aspect of the present disclosure, a battery rack, in which seismic performance is enhanced while a weight is not increased compared to an existing battery rack, and a power storage apparatus including the battery rack may be provided.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A power storage apparatus described below may be an apparatus that stores power excessively generated by the sunlight or a power plant, or transmits the power at a power peak. The power storage apparatus may use physical energy or chemical energy as an energy source. Hereinafter, an embodiment using a secondary battery as the chemical energy source will be described.

Figure 1:
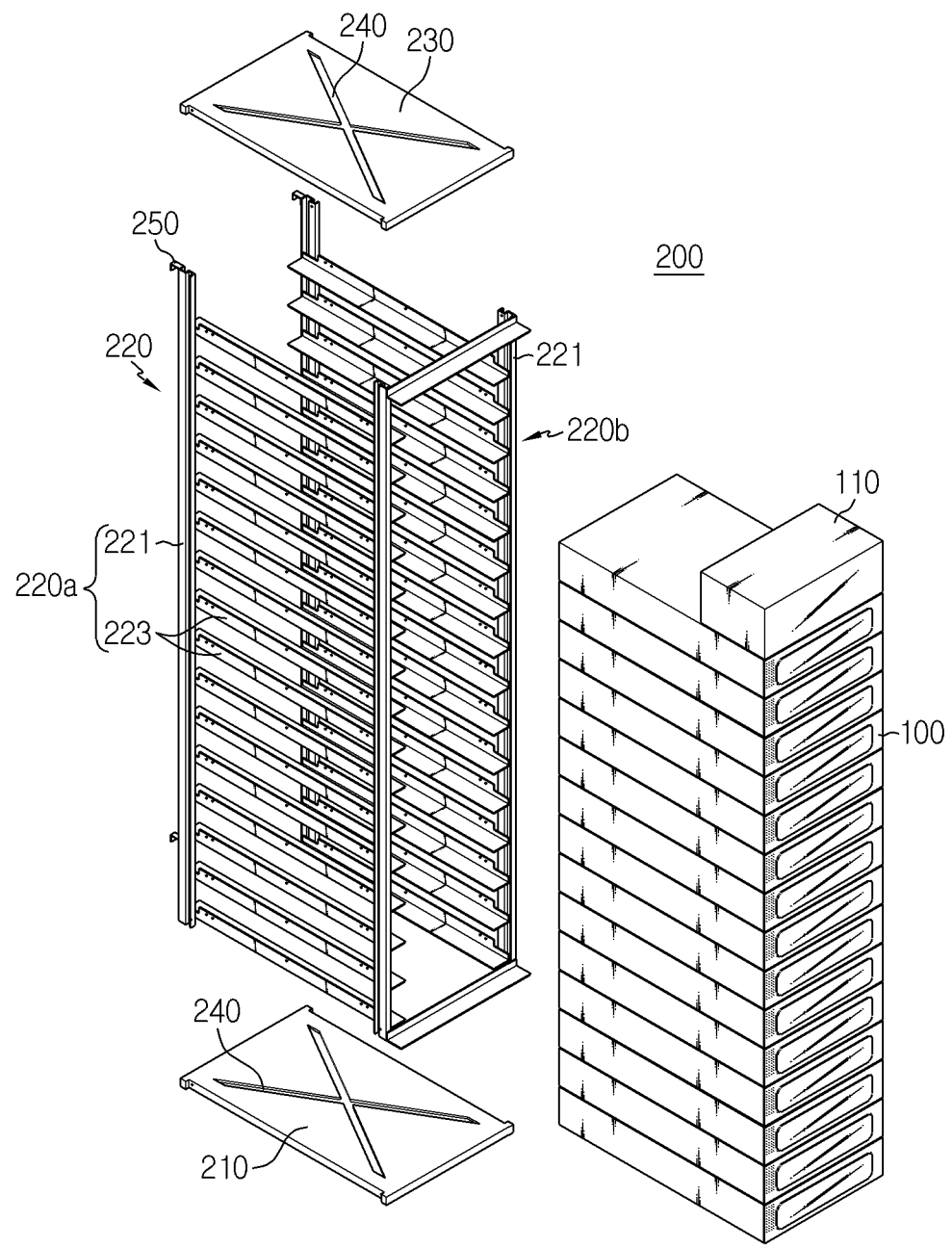
FIG. 1 is an exploded perspective view of a power storage apparatus according to an embodiment of the present disclosure.
Figure 2:
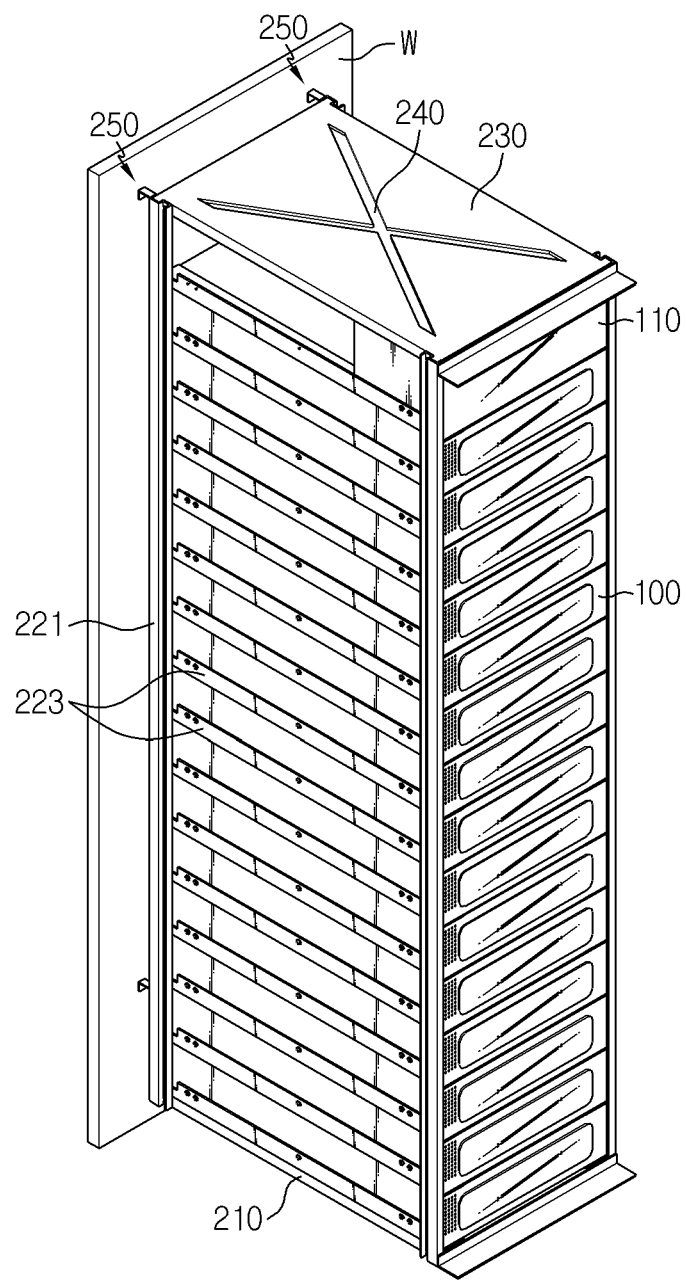
FIG. 2 is a combined perspective view of FIG. 1.
Figure 3:
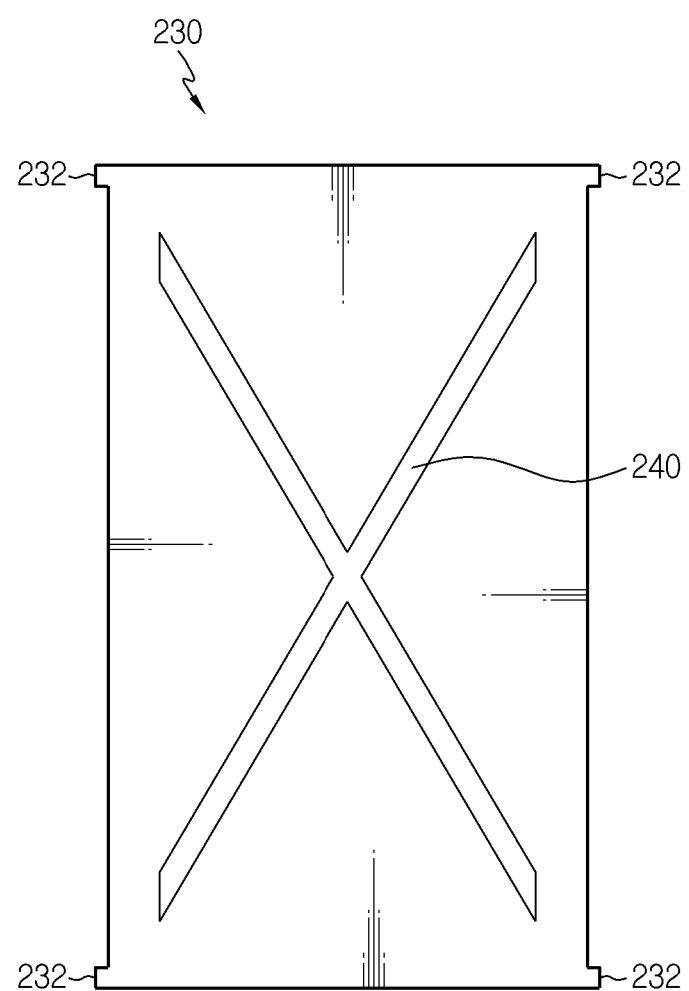
FIG. 3 is a view showing a top plate of FIG. 1.

FIG. 1 is an exploded perspective view of a power storage apparatus according to an embodiment of the present disclosure, FIG. 2 is a combined perspective view of FIG. 1, and FIG. 3 is a view showing a top plate of FIG. 1.

Referring to the drawings, the power storage apparatus according to an embodiment of the present disclosure includes battery modules 100 and a battery rack 200 provided such that the battery modules 100 are stacked in a layered manner.

The battery modules 100 are not shown in detail for convenience of the drawings, but each include a battery cell and a module case.

A battery cell is a secondary battery and at least one or a plurality of battery cells may be provided. Any one of a pouch type secondary battery, a square secondary battery, and a cylindrical secondary battery may be employed. The current embodiment relates to a battery module in which pouch type secondary batteries that are easily stacked and have easily increased energy density are accommodated in a module case.

The module case may be provided in a metal material having good mechanical rigidity to protect the battery cells from an external impact, and may include an air inlet and an air outlet. For example, the air inlet may be provided at one front side of the module case and external air may be guided into the module case via the air inlet to cool the battery cells. The air outlet may be provided at one rear side of the module case and hot air and heat may be discharged to the outside from the inside of the module case via the air outlet.

The air inlet and the air outlet may be implemented by forming a plurality of perforation holes on the module case and a fan may be installed in at least one of the air inlet or the air outlet to forcibly introduce or discharge the external air into or out of the module case.

As shown in FIG. 2, the battery modules 100 may be stacked in multiple stages in the battery rack 200 provided in a tower form. The battery rack 200 may be a structure for safely accommodating and storing the battery module 100.

Meanwhile, the battery rack 200 of the present disclosure is configured to secure sufficient seismic performance without increasing a thickness of the battery rack 200 by applying a geometric structure advantageous in securing the seismic performance, such as a bead 240. Accordingly, the battery rack 200 of the present disclosure has a total weight less than that of other existing battery rack having a same level of seismic performance, and thus is easily transported and installed and has reduced material costs.

Hereinafter, a configuration of the battery rack 200 will be described. The battery rack 200 includes a base plate 210, a main frame 220, a top plate 230, and a wall mount member 250.

The base plate 210 is a portion forming a bottom surface of the battery rack 200 and may be a rough plate body having a larger area than the battery module 100. Since the base plate 210 supports weights of the battery modules 100 and battery rack 200, the base plate 210 may have a metal plate shape to secure rigidity and the bead 240 is applied on a plate surface thereof. The bead 240 may have an X shape. Additional description about the X-shaped bead 240 will be described below.

The main frame 220 is combined to the base plate 210 and extends in a height direction to form a wall structure for supporting both side portions of the battery modules 100. An internal space of the battery rack 200 may be limited by the main frame 220.

The main frame 220 includes a first main frame 220a and a second main frame 220b, which are spaced apart from each other and arranged on two sides of the base plate 210, i.e., on two long sides of the base plate 210. A distance between the first main frame 220a and the second main frame 220b corresponds to a width of the battery module 100. As shown in FIG. 2, the battery modules 100 may be stacked to be inserted between the first main frame 220a and the second main frame 220b while the both side portions are supported.

More specifically, the first main frame 220a and the second main frame 220b each include a pair of vertical beams 221 spaced apart from each other in a length direction and extending in a height direction of the base plate 210, and a plurality of guide beams 223 combined to the pair of vertical beams 221 at regular intervals in the height direction and provided to support a bottom corner region of the battery module 100.

The guide beams 223 have an approximate cross-section in an "L" shape, one surface is combined to the pair of vertical beams 221, and the other surface supports the bottom corner region of the battery module 100. The intervals of the plurality of guide beams 223 correspond to the thickness of the battery module 100. The battery modules 100 may be inserted between the guide beams 223 one by one to be arranged in a layered manner.

The top plate 230 is a component forming a ceiling of the battery rack 200, the ceiling covering an upper space of the battery modules 100 by being combined to an uppermost portion of the main frame 220. In particular, like the base plate 210, the top plate 230 of the current embodiment includes the bead 240 on a plate surface to enhance seismic performance.

The bead 240 on the base plate 210 and the top plate 230 described above has an X shape. In other words, the base plate 210 and the top plate 230 have a rectangular plate surface and the bead 240 may be formed in an X shape crossing an entire area of the rectangular plate surface. Obviously a shape of the bead 240 may be in various patterns, such as a circle, an oval, and a honeycomb. However, as in the current embodiment, the bead 240 on the base plate 210 and the top plate 230 may be the X shape.

In detail, the base plate 210 and the top plate 230 may be a structure supporting the first main frame 220a and the second main frame 220b to have a uniform interval. When the base plate 210 and the top plate 230 are deformed due to vibration or an impact, the first main frame 220a and the second main frame 220b connected therebetween are also twisted. In this regard, structural rigidity of the base plate 210 and the top plate 230 largely affects the seismic performance of the battery rack 200.

The battery rack 200 is often fixed and installed on a wall surface W and when a vibration test is performed after fixing the battery rack 200 on the wall surface W, it is observed that a stress is highly distributed in an X shape in the base plate 210 and the top plate 230. Thus, the current embodiment applies the X-shaped bead 240 to the base plate 210 and the top plate 230, based on an X-shaped stress distribution in which a stress is concentrated in the base plate 210 and/or the top plate 230. Accordingly, the X-shaped bead 240 may be further advantageous in securing the rigidity and reducing a deformation rate of the base plate 210 and the top plate 230 compared to the bead 240 of another shape.

The base plate 210 and the top plate 230 of the current embodiment each include a side protruding portion 232. For example, as shown in FIG. 3, the side protruding portion 232 denotes a portion further protruding at four corner regions of the top plate 230 in a width direction than other portions. The vertical beam 221 may have a cross-section in a "ㄹ" shape to be adhered on side surfaces (thickness surfaces) of the base plate 210 and the top plate 230 while surrounding the side protruding portion 232, and may be fastened to the adhered surface via a bolt B. Here, the bolt B may not be exposed to the vertical beam 221 but may be hidden by fastening the bolt B inside a space ⓐ neighboring a portion of the vertical beam 221, which surrounds the side protruding portion 232 (see FIG. 6).

As such, since the vertical beams 221 are respectively configured to be assembled to the base plate 210 and the top plate 230 in a shape-customized manner, the vertical beams 221 are easily assembled and, after being assembled, are not spaced apart from a counterpart even when external force is applied. Also, since the cross-sections of the vertical beams 221 are provided in a "ㄹ" shape, the entire weight of the battery rack 200 may be reduced while maintaining at least a certain level of rigidity.

The battery rack 200 according to the current embodiment may further include the wall mount member 250.

As described above, the battery rack 200 may be fixedly installed to the bottom and wall surface W. As another example, although not illustrated, the entire battery rack 200 may be accommodated inside an external cabinet (not shown) and the external cabinet may be fixed and installed on the wall surface W. In both cases of fixing and installing the battery rack 200 directly on the wall surface W, and of accommodating the battery rack 200 in the external cabinet and fixing and installing the external cabinet on the wall surface W, the wall mount member 250 may be used to fix the battery rack 200 itself to the counterpart.

Figure 4:
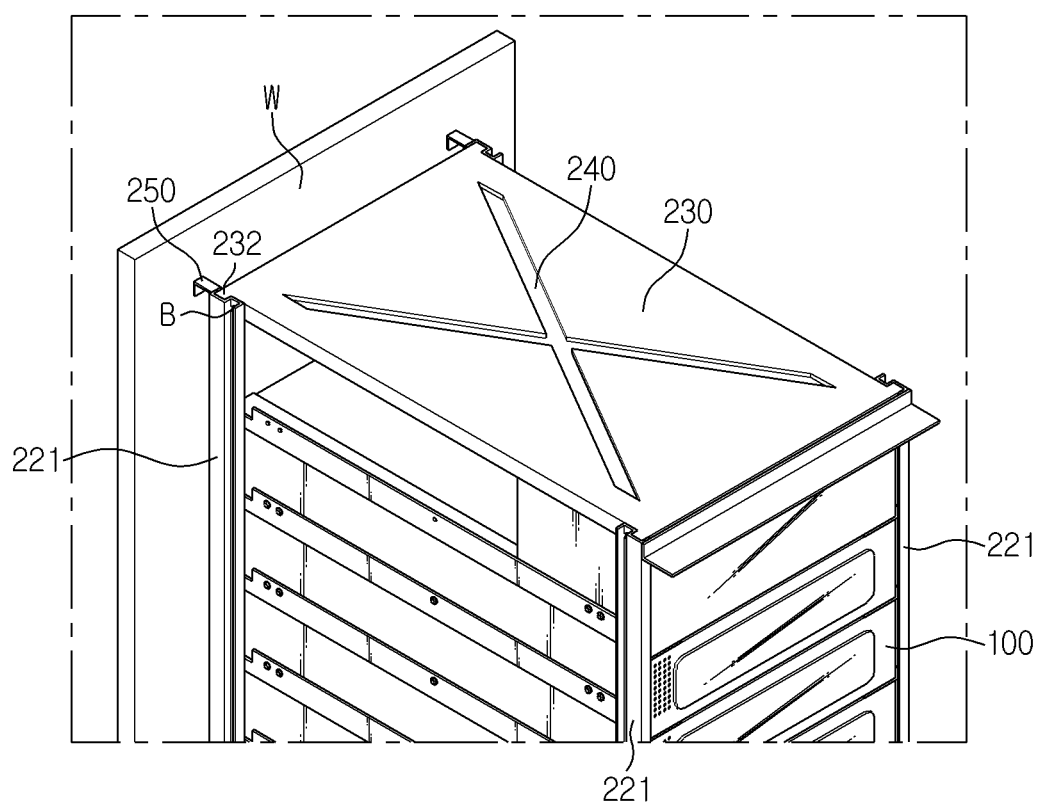
FIG. 4 is a partial enlarged view of FIG. 2.

As shown in FIG. 4, the wall mount member 250 may be combined to the vertical beams 221 at a rear side of the battery rack 200 from the first main frame 220a and the second main frame 220b. The wall mount member 250 of the current embodiment has an approximately "ㄷ" shape, wherein one side may be integrally combined to the vertical beam 221 and the side protruding portion 232, and the other side may be combined to the wall surface W. At least one wall mount member 250 may be applied along the height direction of the battery rack 200. The battery rack 200 may be fixed while being spaced apart from the wall surface W at a predetermined interval by using the wall mount member 250 as a medium. By securing a slight space between the battery rack 200 and the wall surface W, heat generated in the battery module 100 may be radiated and materials such as wires and the like may bypass to the rear of the battery rack 200.

Figure 5:
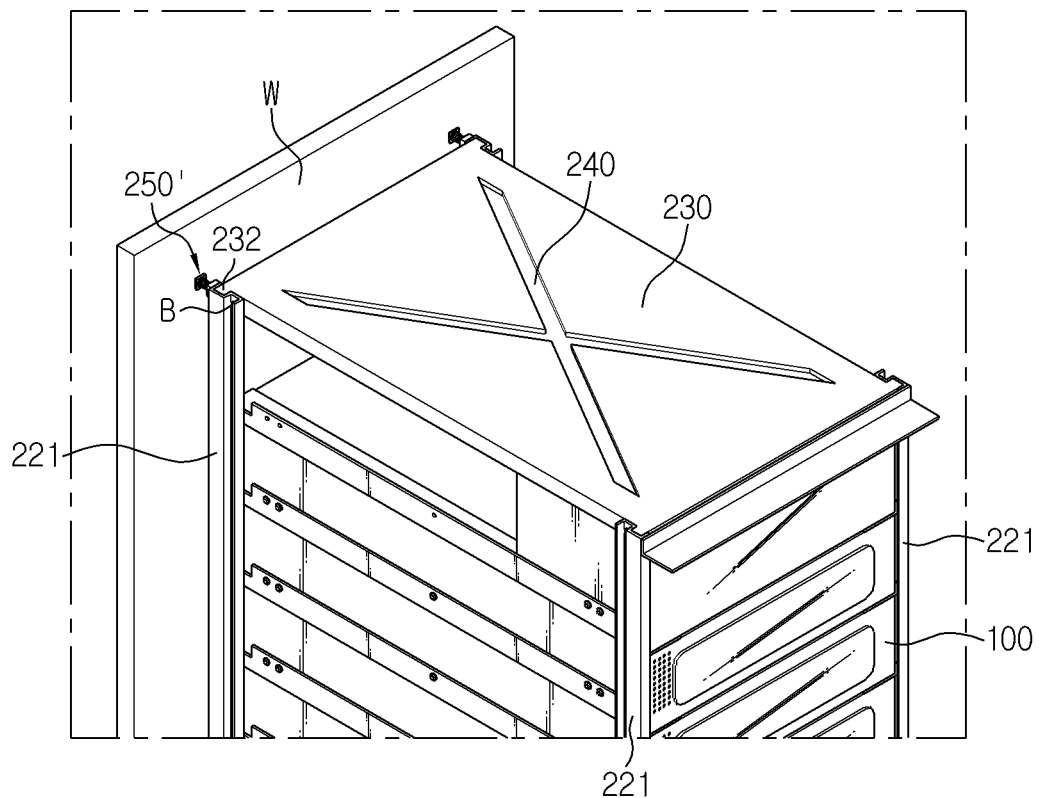
FIG. 5 is a view corresponding to FIG. 4 and is a view of a battery rack employing a wall mount member according to another embodiment of the present disclosure.
Figure 6:
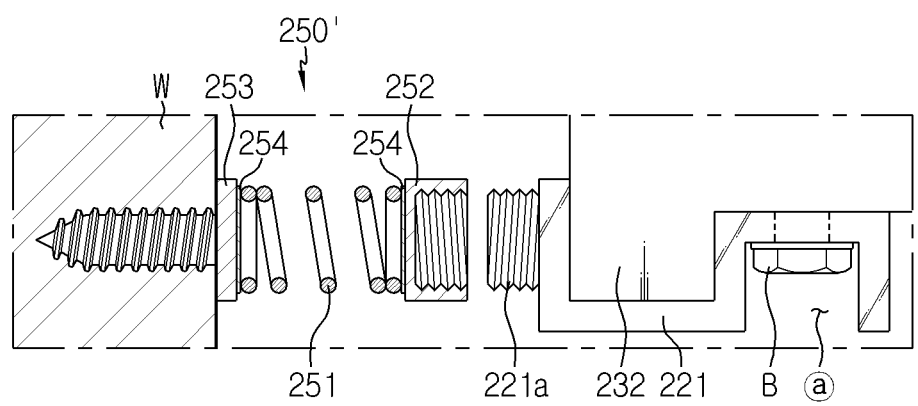
FIGS. 6 and 7 are cross-sectional views for describing an installation example of the wall mount member of FIG. 5.
Figure 7:
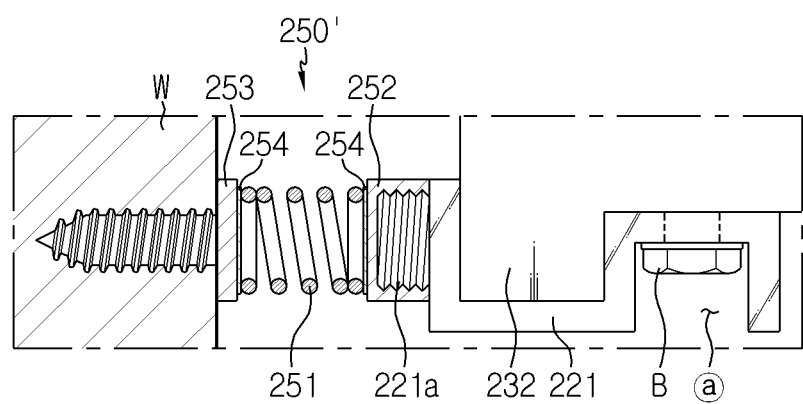

FIG. 5 is a view corresponding to FIG. 4 and is a view of the battery rack 200 employing a wall mount member 250' according to another embodiment of the present disclosure, and FIGS. 6 and 7 are cross-sectional views for describing an installation example of the wall mount member 250' of FIG. 5.

Next, another embodiment of the present disclosure will be described with reference to FIGS. 5 through 7. The same reference numerals as the embodiment described above denote the same elements, and overlapping descriptions about the same elements will be omitted and differences with the embodiment described above will be mainly described.

The wall mount member 250 of the embodiment described above is configured as a bracket having "ㄷ" shape, whereas a wall mount member 250' of the current embodiment is provided to elastically support the main frame 220 with respect to the wall surface W by including an elastic body.

In detail, referring to FIGS. 6 and 7, the wall mount member 250' according to the current embodiment includes a spring 251 corresponding to the elastic body, a rack fixing portion 252 combined to one end portion of the spring 251 and having a screw thread formed therein, and a wall surface fixing portion 253 combined to another end portion of the spring 251 and including a fastening unit screw-combinable to the wall surface W.

The vertical beams 221 arranged at the rear sides of the first main frame 220a and the second main frame 220b may further include a wall mount fastening portion 221a to be combined with the rack fixing portion 252 of the wall mount member 250'. The wall mount fastening portion 221a may be embodied in a protruding shape including a screw thread on an external circumference screw-combinable with the rack fixing portion 252.

The wall mount member 250' may further include a rotating plate 254 to rotate each of the rack fixing portion 252 and the wall surface fixing portion 253 with respect to the spring 251. For example, both ends of the spring 251 may be fixed to the rotating plate 254 and the rack fixing portion 252 may be assembled to the rotating plate 254 to be relatively rotatable. Like the rack fixing portion 252, the wall surface fixing portion 253 may be assembled to the rotating plate 254 to be relatively rotatable.

A method of installing the wall surface W of the battery rack 200 using the wall mount member 250' will be briefly described.

As shown in FIG. 6, first, the wall mount member 250' is fixed to the wall surface W. Here, the wall mount member 250' may be installed to the wall surface W by rotating the wall surface fixing portion 253 clockwise in the similar manner as a screw fastening method. Next, the battery rack 200 is conveyed to be located close to the wall surface W, and as shown in FIG. 7, the rack fixing portion 252 is inserted into the wall mount fastening portion 221a and rotated clockwise to combine the rack fixing portion 252 and the wall mount fastening portion 221a.

On the contrary to the above method, the rack fixing portion 252 and the wall mount fastening portion 221 may be first combined to convey the battery rack 200 close to the wall surface W while the wall mount member 250' is mounted on the battery rack 200, and then the wall surface fixing portion 253 may be combined to the wall surface W.

When the battery rack 200 is fixed to the wall surface W by using the wall mount member 250' of the current embodiment, the spring 251 of the wall mount member 250' absorbs the load during vibration caused by the earthquake or another external impact, and thus a stress may be prevented from being concentrated on the base plate 210, the main frame 220, and the top plate 230 configuring a structure of the battery rack 200.

According to the configuration of the present disclosure described above, the battery rack 200 having enhanced seismic performance without increasing the weight compared to an existing battery rack may be provided, and by mounting, in the battery rack 200, the battery modules 100 and a battery protection system 110 for monitoring a charging and discharging state, a heat generation state, and the like of each battery module 100 and controlling an operation to configure the power storage apparatus, a seismic design strength requirement of a current power storage apparatus may be sufficiently satisfied.

As described above, although the present disclosure has been described with reference to limited embodiments and drawings, the present disclosure is not limited thereto and various modifications and variations may be implemented by one of ordinary skill in the art within the technical ideas of the present disclosure and the equivalent scope of the claims described below.

Meanwhile, terms used to indicate directions such as up, down, left, and right are used in the present specification, but these terms are merely for convenience of description and it would be obvious to one of ordinary skill in the art that the terms may vary depending on a location of a target object or a location of an observer.

What is claimed is:

1. A battery rack, the battery rack comprising:
   a base plate forming a bottom surface;
   a main frame combined to the base plate and extending in a height direction to form a wall structure for supporting side portions of a plurality of battery modules;
   a top plate combined to an uppermost portion of the main frame to form a ceiling; and
   a pair of vertical beams spaced apart from each other in a length direction of the base plate and each extending in a height direction,
   wherein at least one of the top plate and the base plate is provided in a plate body shape including a bead, and
   wherein the base plate and the top plate each have a quadrangular plate shape and comprise a side protruding portion protruding at a corner region in a width direction, and
   wherein the pair of vertical beams each have a cross-section in a "ᄅ" shape such that both end portions thereof are combined to the base plate and the top plate while surrounding the side protruding portion.

2. The battery rack of claim 1, wherein the bead is provided on both the top plate and the base plate, and
   wherein the top plate and the base plate are rectangular plate bodies and the bead is formed in an X shape crossing each of the rectangular plate bodies.

3. The battery rack of claim 1, wherein the main frame comprises a first main frame and a second main frame, which are spaced apart from each other by a width of the plurality of battery modules, and
   wherein each of the first main frame and the second main frame comprises:
   a plurality of guide beams combined to the pair of vertical beams at regular intervals along the height direction and provided to support a bottom corner region of the plurality of battery modules.

4. The battery rack of claim 1, wherein a wall mount member is combined to one of the pair of vertical beams in the first and second main frames.

5. The battery rack of claim 4, wherein the wall mount member is integrally combined to one of the pair of vertical beams and the side protruding portion.

6. The battery rack of claim 4, wherein the wall mount member comprises an elastic body to elastically support the main frame with respect to a wall surface.

7. A battery rack, the battery rack comprising:
   a base plate forming a bottom surface;
   a main frame combined to the base plate and extending in a height direction to form a wall structure for supporting side portions of a plurality of battery modules;
   a top plate combined to an uppermost portion of the main frame to form a ceiling;
   a pair of vertical beams spaced apart from each other in a length direction of the base plate and each extending in a height direction; and
   a wall mount member attached to the main frame,
   wherein the wall mount member comprises:
   a spring to elastically support the main frame with respect to a wall surface;
   a rack fixing portion combined to a first end portion of the spring and having a screw thread formed therein; and
   a wall surface fixing portion combined to a second end portion of the spring and comprising a fastening unit screw-combinable to the wall surface,
   wherein one of the pair of vertical beams further comprises a wall mount fastening portion screw-combined to the rack fixing portion at one side.

8. A battery rack, the battery rack comprising:
   a base plate forming a bottom surface;
   a main frame combined to the base plate and extending in a height direction to form a wall structure for supporting side portions of a plurality of battery modules;
   a top plate combined to an uppermost portion of the main frame to form a ceiling; and
   a wall mount member attached to the main frame,
   wherein the wall mount member comprises:
   a rack fixing portion attached to the main frame; and
   a wall surface fixing portion spaced from and attached to the rack fixing portion, wherein the rack fixing portion and the wall surface fixing portion of the wall mount member are provided to be relatively rotatable with respect to each other.

9. A power storage apparatus comprising:
the battery rack according to claim 1; and
a plurality of battery modules stacked in the battery rack in multiple stages.

10. The battery rack according to claim 7, further comprising a plurality of battery modules stored in the main frame.

11. The battery rack according to claim 10, wherein the spring is attached to and extends outwardly from one of the vertical beams.

12. The battery rack according to claim 7, wherein the spring is attached to and extends outwardly from one of the vertical beams.

13. The battery rack according to claim 8, further comprising a plurality of battery modules stored in the main frame.

14. The battery rack according to claim 8, further comprising a spring between the rack fixing portion and the wall surface fixing portion, a first end of the spring connected to the rack fixing portion and a second end of the spring connected to the wall surface fixing portion.

* * * * *